(12) United States Patent
Kurtz

(10) Patent No.: US 6,981,018 B2
(45) Date of Patent: Dec. 27, 2005

(54) SYSTEM AND METHOD FOR POSTING A DOCUMENT

(75) Inventor: Barry D. Kurtz, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 840 days.

(21) Appl. No.: 09/757,062

(22) Filed: Jan. 9, 2001

(65) Prior Publication Data

US 2002/0091759 A1     Jul. 11, 2002

(51) Int. Cl.⁷ .............................................. G06F 15/16
(52) U.S. Cl. ...................... 709/203; 709/201; 709/202; 709/232; 709/238; 709/239; 709/206; 709/219
(58) Field of Search ................................ 709/201, 202, 709/203, 232, 238, 239, 206, 219; 712/214, 712/220

(56) References Cited

U.S. PATENT DOCUMENTS

| | | | | |
|---|---|---|---|---|
| 5,689,708 A | * | 11/1997 | Regnier et al. | 709/229 |
| 5,694,546 A | * | 12/1997 | Reisman | 705/26 |
| 6,044,205 A | * | 3/2000 | Reed et al. | 709/201 |
| 6,185,603 B1 | * | 2/2001 | Henderson et al. | 709/206 |
| 6,578,025 B1 | * | 6/2003 | Pollack et al. | 707/2 |
| 6,594,692 B1 | * | 7/2003 | Reisman | 709/219 |
| 6,694,482 B1 | * | 2/2004 | Arellano et al. | 715/500.1 |
| 6,732,101 B1 | * | 5/2004 | Cook | 707/10 |

OTHER PUBLICATIONS

Walker, F. L., Thomas, GR. "Internet Document Access and Delivery", Proc. IOLS '96. Medford N.J.: Information Today, 1996; pp 107-116.*
Groves, Jim; Extending Outlook 2000; Microsoft Corporation; Jun. 1999; pp. 1-6; [http://msdn.microsoft.com/library/default.asp?url=/library/en-us/odc_ol2003_ta/html/odc_OLWhatsNew2k3.asp].
Webmail Evaluation Task Force Draft Report Jul. 24, 2000; Penn Computing: pp. 1-4; [http://www.upenn.edu/computing/group/webmail/2000/] (in www.archive.org provided on Aug. 17, 2000) (found on Jul. 13, 2004).

* cited by examiner

Primary Examiner—Anthony Knight
Assistant Examiner—Thomas Pham

(57) ABSTRACT

An interactive delivery interface provides a user with frequently used delivery instructions for selection. Examples of delivery instructions include destinations, delivery methods, and delivery method specific options. The frequently used delivery instructions are gathered for a particular user. The frequently used delivery instructions are either gathered iteratively or concurrently. The frequently used delivery instructions are associated with the particular user. The interactive delivery interface is launched. The particular user is identified. The frequently used delivery instructions associated with the particular user are presented to the user for selection. Examples of presenting the frequently used delivery instructions include displaying favorite delivery instructions and displaying a list of frequently used delivery instructions. The document is posted according to selected frequently used delivery instructions.

20 Claims, 4 Drawing Sheets

SYSTEM AND METHOD FOR POSTING A DOCUMENT

FIELD OF THE INVENTION

This invention relates in general to user interfaces and, more particularly, to a print service user interface with user preferences.

BACKGROUND OF THE INVENTION

Web based document delivery services have been in existence for some time. Recently, these web-based delivery services have become more comprehensive and now allow a user to select from a variety of destinations, delivery methods, and delivery method specific options.

Conventionally, a user desiring to deliver a document using a web-based delivery service must launch a user interface and indicate destination, delivery method, and delivery method specific options. All of this information had to be entered for each document to be delivered.

Usually, a user delivers documents to a small number of destinations and typically uses very few delivery method and delivery method specific options. Requiring repeated input of these destinations may be time consuming and tedious.

Many Internet web sites have the ability to store user preferences and recall the preferences when the user visits the web page. These user preferences often take the form of configuration directing the web site concerning what information to display and in what format to display the information.

SUMMARY OF THE INVENTION

According to principles of the present invention, an interactive delivery interface provides a user with frequently used delivery instructions for selection. The frequently used delivery instructions are gathered for a particular user. The frequently used delivery instructions are associated with the particular user. The interactive delivery interface is launched. The particular user is identified. The frequently used delivery instructions associated with the particular user are presented to the user for selection. The document is posted according to selected frequently used delivery instructions.

According to further principles of the present invention, the frequently used delivery instructions are either gathered iteratively or concurrently.

According to further principles of the present invention, the examples of presenting the frequently used delivery instructions includes displaying favorite delivery instructions and displaying a list of frequently used delivery instructions.

According to further principles of the present invention, examples of delivery instructions include destinations, delivery methods, and delivery method specific options.

DETAILED DESCRIPTION OF THE INVENTION

Figure 1:
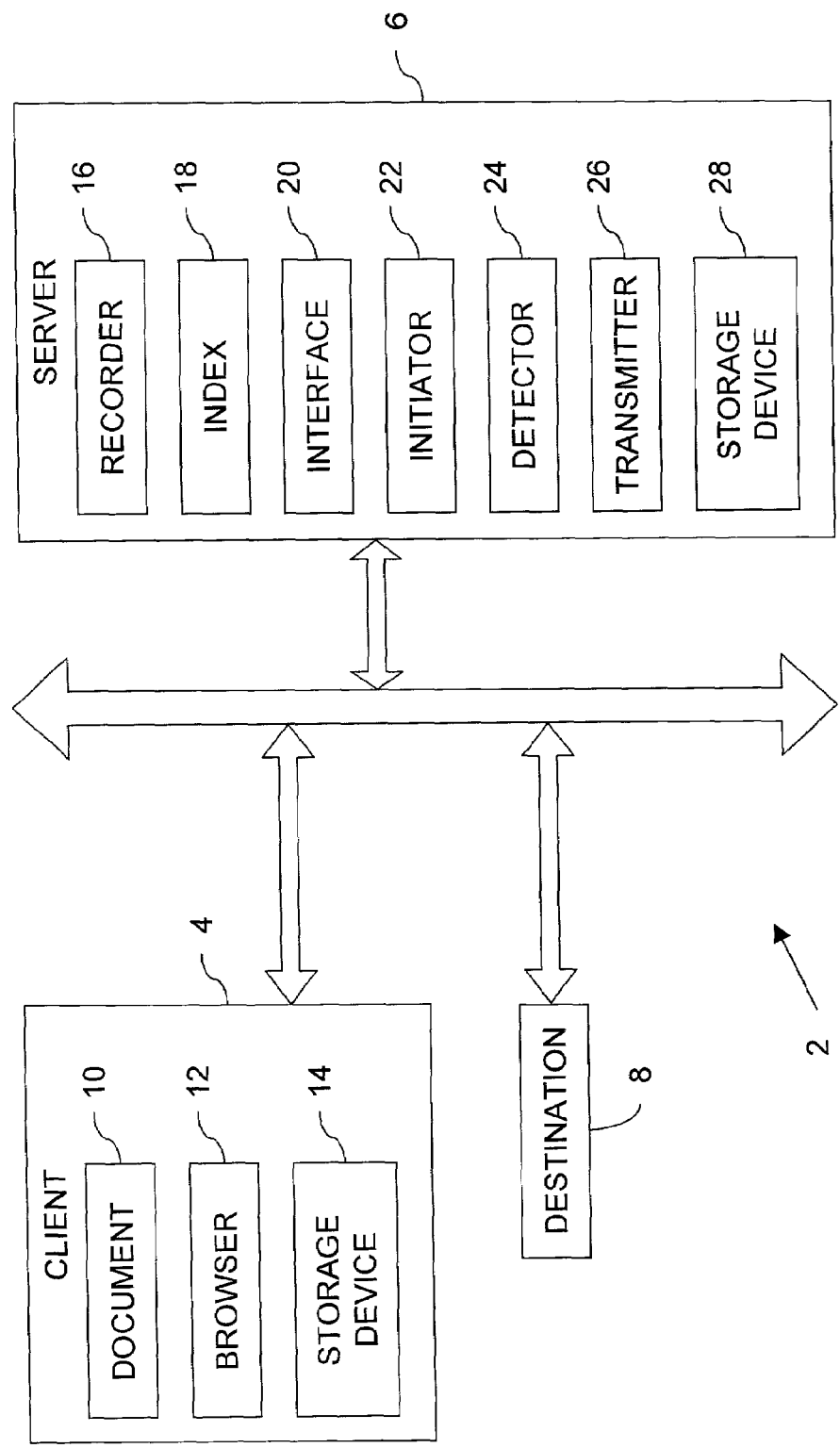
FIG. 1 is a block diagram representing one embodiment of the system of the present invention for posting a document.

FIG. 1 shows, in block diagram form, a system 2 for posting a document using frequently used delivery instructions. System 2 includes client 4, server 6, and destination 8.

Client 4 is any device or system, such as a specific or general purpose computer, that includes a means, such as a processor, for processing executable code. Client 4 includes a document 10, a browser 12, and, optionally, a client storage device 14.

Document 10 is any document postable to destination 8. Examples of document 10 include word processor documents, text documents, image documents, and spreadsheet documents.

Browser 12 is any browser capable of browsing web pages. Examples of browser 12 include Netscape Navigator, Opera browser, and Microsoft Internet Explorer.

Client storage device 14 is any device for storing data or executable code. Both document 10 and browser 12 may be stored on client storage device 14. Client storage device 14 may also be a program client storage device tangibly embodying a program, applet, or instructions executable by client 4 for performing the method steps of the present invention executable by client 4. Client storage device 14 may be any type of storage media such as magnetic, optical, or electronic storage media. Although depicted as integral to client 4, client storage device 14 is alternatively embodied separate from client 4 and accessible by client 4.

Server 6 is any device or system acting as a server for document 10.

Server 6 receives document 10 from client 4 and posts document 10 to destination 8. Server 6 posts document 10 either by holding document 10 for retrieval by destination 8 or transmiting document 10 to destination B. Examples of server 6 include an email server, a data server, a file server, and a print server.

Server 6 includes recorder 16, index 18, interface 20, initiator 22, detector 24, transmitter 26, and, optionally, server storage device 28. Recorder 16 is any combination of hardware and executable code configured to configured to gather frequently used delivery instructions for a particular user. Index 18 is any combination of hardware and executable code configured to associate the frequently used delivery instructions with the particular user. Interface 20 is any combination of hardware and executable code configured to present, for selection, the frequently used delivery instructions associated with the particular user. Initiator 22 is any combination of hardware and executable code configured to launch the interactive delivery interface. Detector 24 is any combination of hardware and executable code configured to identify the particular user. Transmitter 26 is any combination of hardware and executable code configured to post the document according to selected frequently used delivery instructions.

Server storage device 28 is any device for storing data or executable code. Recorder 16, index 18, interface 20, initiator 22, detector 24, transmitter 26 may be stored on server storage device 28. Server storage device 28 may also be a program server storage device tangibly embodying a program, applet, or instructions executable by server 6 for performing the method steps of the present invention executable by server 6. Server storage device 28 may be any type of storage media such as magnetic, optical, or electronic storage media. Although depicted as integral to server 6, server storage device 28 is alternatively embodied separate from server 6 and accessible by server 6.

Destination 8 is any device or system for receiving document 10. Examples of destination 8 include a printer, a facsimile machine, a computer, a printing service and a document archival and retrieval service.

Figure 2:
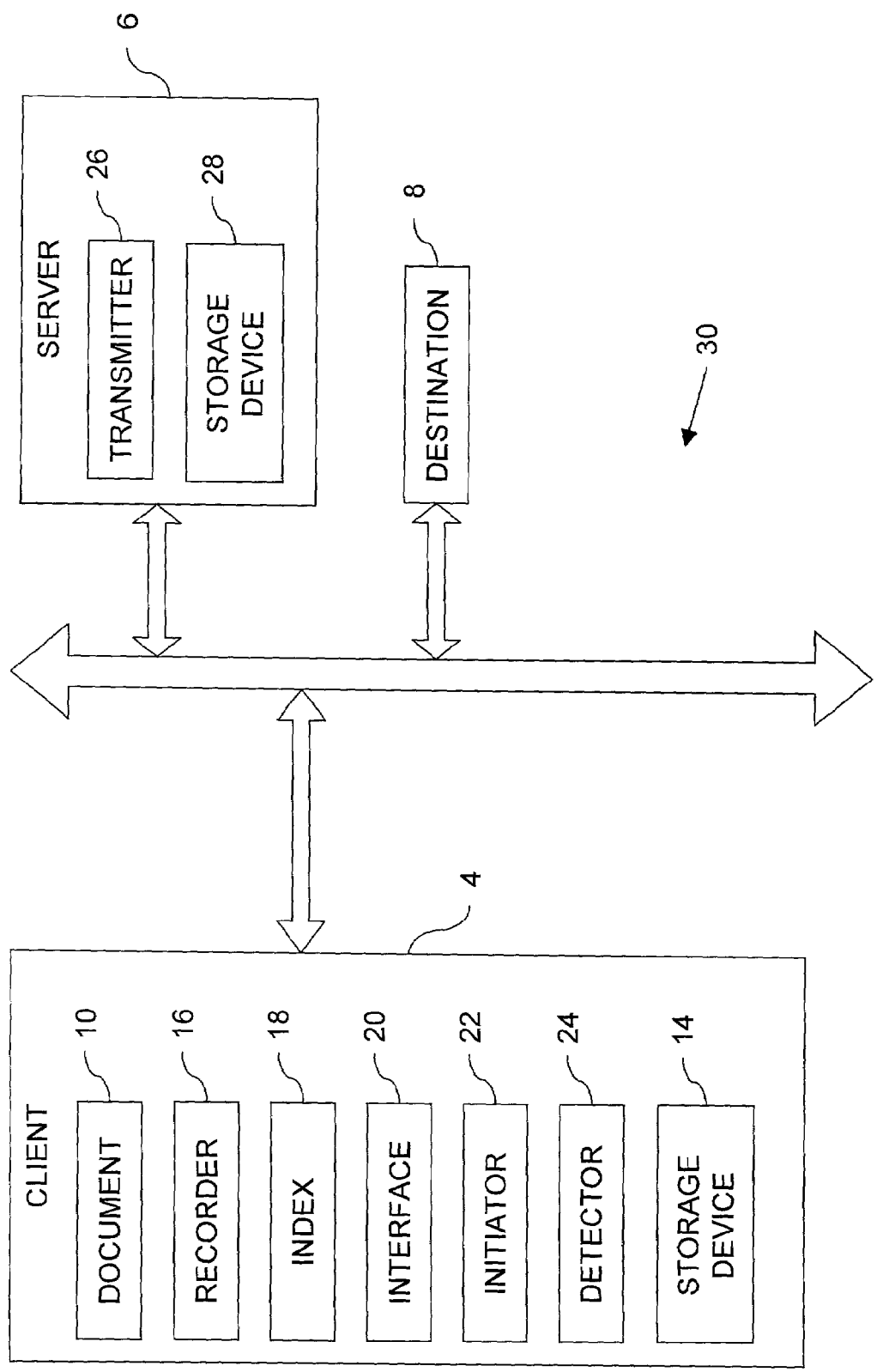
FIG. 2 is a block diagram representing an alternate embodiment of the system of the present invention for posting a document.

FIG. 2 shows, in block diagram form, an alternate embodiment system 30 for posting a document using frequently used delivery instructions. Many of the components in system 30 are similar or identical to components in system 2. Like components are labeled identically. System 30 includes client 4, server 6, and destination 8.

Client 4 is any device or system, such as a specific or general purpose computer, that includes a means, such as a processor, for processing executable code. Client 4 includes document 10, recorder 16, index 18, interface 20, initiator 22, detector 24, and, optionally, client storage device 14.

Client storage device 14 is any device for storing data or executable code. Document 10, recorder 16, index 18, interface 20, initiator 22, detector 24, and transmitter 26 may be stored on server storage device 28. Client storage device 14 may also be a program client storage device tangibly embodying a program, applet, or instructions executable by client 4 for performing the method steps of the present invention executable by client 4. Client storage device 14 may be any type of storage media such as magnetic, optical, or electronic storage media. Although depicted as integral to client 4, client storage device 14 is alternatively embodied separate from client 4 and accessible by client 4.

Server 6 is any device or system acting as a server for document 10. Server 6 receives document 10 from client 4 and posts document 10 to destination 8. Server 6 posts document 10 either by holding document 10 for retrieval by destination 8 or transmits document 10 to destination 8. Examples of server 6 include an email server, a data server, a file server, and a print server.

Server 6 includes transmitter 26 and, optionally, server storage device 28. Server storage device 28 is any device for storing data or executable code. Server storage device 28 may also be a program server storage device tangibly embodying a program, applet, or instructions executable by server 6 for performing the method steps of the present invention executable by server 6. Server storage device 28 may be any type of storage media such as magnetic, optical, or electronic storage media. Although depicted as integral to server 6, server storage device 28 is alternatively embodied separate from server 6 and accessible by server 6.

Figure 3:
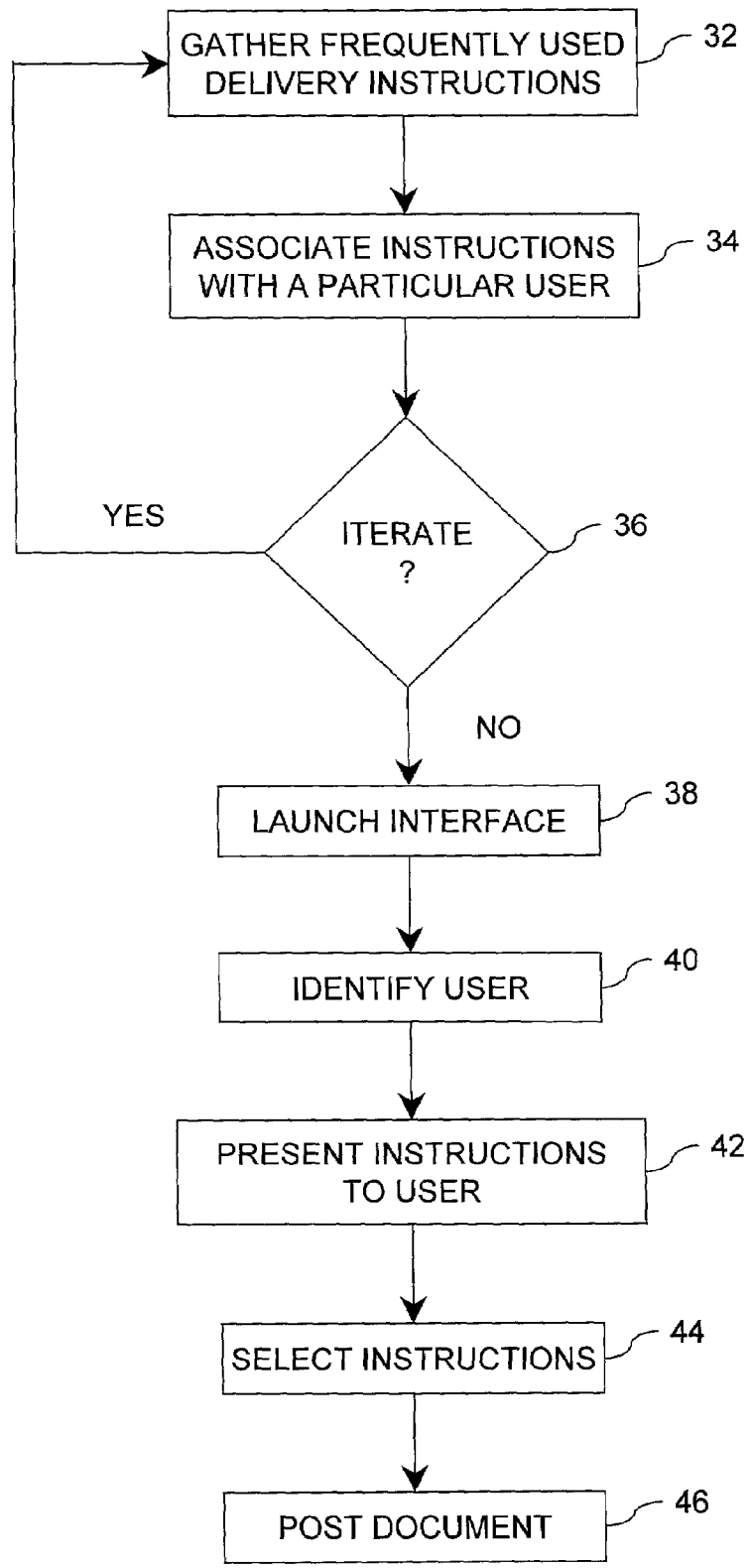
FIG. 3 is a flow chart illustrating one embodiment of the method of the present invention for posting a document.

FIG. 3 is a flow chart representing steps of one embodiment of the present invention. Although the steps represented in FIG. 3 are presented in a specific order, the present invention encompasses variations in the order of steps. Furthermore, additional steps may be executed between the steps illustrated in FIG. 3 without departing from the scope of the present invention.

Frequently used delivery instructions are gathered 32 for a particular user. Examples of delivery instructions include destinations, delivery methods, and delivery method specific options. In one embodiment, recorder 16 gathers 32 the frequently used delivery instructions.

The frequently used delivery instructions are associated 34 with the particular user. In one embodiment, index 18 associates 34 the frequently used delivery instructions with the particular user.

The frequently used delivery instructions may be gathered 32 and associated 34 all at once or iteratively 36. For example, the frequently used delivery instructions may be gathered 32 all at once by entering the frequently used delivery instructions or importing the frequently used delivery instructions. The frequently used delivery instructions may be gathered 32 iteratively 36 by tracking delivery instructions entered by the user whenever the user enters delivery instructions not already represented in index 18.

Interactive delivery interface 20 is launched 38. In one embodiment, interactive delivery interface 20 is launched 38 by initiator 22. In an alternative embodiment, interactive delivery interface 20 is launched 38 by launching browser 20 and displaying interactive delivery interface 20 within browser 12.

The particular user is identified 40. In one embodiment, detector 24 identifies 40 the particular user. The particular user may be identified 40 by any means. One example of a conventional means for identifying 40 the user is to prompt the user for a username and to receive the username from the user. In a further example, once the particular user is identified, a browser cookie may be stored in client storage device 14 for future identification 40 of the particular user.

The frequently used delivery instructions associated with the particular user are presented 42 for selection. Examples of presenting the frequently used delivery instructions include displaying favorite delivery instructions and displaying a list of frequently used delivery instructions. In one embodiment, interactive delivery interface 20 presents 42 the frequently used delivery instructions.

Figure 4:
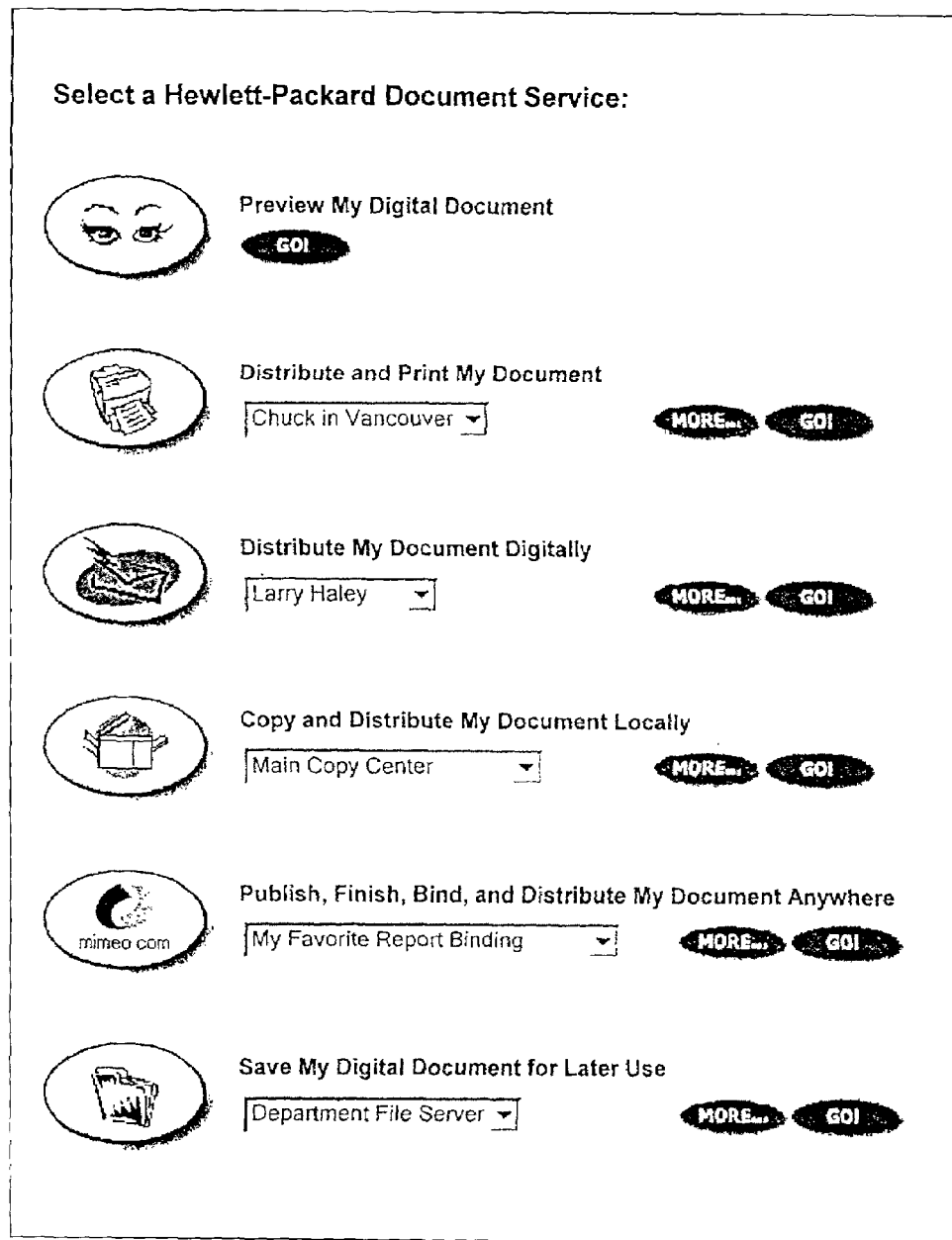
FIG. 4 is one example of an interactive delivery interface for the present invention.

FIG. 4 illustrates on example of interactive delivery interface 20.

Delivery instructions are selected 44. Delivery instructions are selected 44 from a default frequently used delivery instruction, an alternative frequently used delivery instruction, or a manually entered delivery instruction. Manually entered delivery instructions may be included in frequently used delivery instructions for future iterations of the process.

After selection 44 of the frequently used delivery instructions, document 10 is posted 46 according to the selected frequently used delivery instructions. Document 10 is posted 46 either by holding document 10 for retrieval by destination 8 or transmitting document 10 to destination 8.

The foregoing description is only illustrative of the invention. Various alternatives and modifications can be devised by those skilled in the art without departing from the invention. Accordingly, the present invention embraces all such alternatives, modifications, and variances that fall within the scope of the appended claims.

What is claimed is:

1. A method for posting a document, the method comprising:

gathering frequently used delivery instructions for a particular user of a client;

associating the frequently used delivery instructions with the particular user;

launching an interactive delivery interface;

identifying the particular user;

presenting, for selection by the particular user, in the interactive delivery interface, the frequently used delivery instructions associated with the particular user;

communicating the document from the client to a server; and, the server posting the document according to selected frequently used delivery instructions.

2. The method of claim 1 wherein gathering frequently used delivery instructions for the particular user includes iteratively gathering frequently used delivery instructions for the particular user.

3. The method of claim 1 wherein presenting the frequently used delivery instructions includes displaying favorite delivery instructions.

4. The method of claim 1 wherein presenting the frequently used delivery instructions includes displaying a list of frequently used delivery instructions.

5. The method of claim 1 wherein the delivery instructions include destinations.

6. The method of claim 1 wherein the delivery instructions include delivery methods.

7. The method of claim 1 wherein the delivery instructions include delivery method specific options.

8. A system for posting a document, the system comprising:
    a client having a document;
    a server configured to receive the document from the client;
    a recorder configured to gather frequently used delivery instructions for a particular user of the client;
    an index configured to associate the frequently used delivery instructions with the particular user;
    an interface configured to present, for selection by the particular user, the frequently used delivery instructions associated with the particular user;
    an initiator configured to launch the interface;
    a detector configured to identify the particular user; and,
    the server having a transmitter configured to post the document according to selected frequently used delivery instructions.

9. The system of claim 8 wherein the recorder is further configured to iteratively gather frequently used delivery instructions for a particular user.

10. The system of claim 8 wherein the interface is further configured to display favorite delivery instructions.

11. The system of claim 8 wherein the interface is further configured to display a list of frequently used delivery instructions.

12. The system of claim 8 wherein the delivery instructions include destinations.

13. The system of claim 8 wherein the delivery instructions include delivery systems.

14. The system of claim 8 wherein the delivery instructions include delivery system specific options.

15. A program storage device readable by a computer, tangibly embodying a program, applet, or instructions executable by the computer to perform method steps for posting a document, the method steps comprising:
    gathering frequently used delivery instructions for a particular user of a client;
    associating the frequently used delivery instructions with the particular user;
    launching an interactive delivery interface;
    identifying the particular user;
    presenting, for selection by the particular user, in the interactive delivery interface, the frequently used delivery instructions associated with the particular user;
    communicating the document from the client to a server; and,
    the server posting the document according to selected frequently used delivery instructions.

16. The program storage device of claim 15 wherein the method step of presenting the frequently used delivery instructions includes displaying favorite delivery instructions.

17. The program storage device of claim 15 wherein the method step of presenting the frequently used delivery instructions includes displaying a list of frequently used delivery instructions.

18. The program storage device of claim 15 wherein the delivery instructions include destinations.

19. The program storage device of claim 15 wherein the delivery instructions include delivery methods.

20. program storage device of claim 15 wherein the delivery instructions include delivery method specific options.

* * * * *

UNITED STATES PATENT AND TRADEMARK OFFICE
CERTIFICATE OF CORRECTION

PATENT NO. : 6,981,018 B2  Page 1 of 1
APPLICATION NO. : 09/757062
DATED : December 27, 2005
INVENTOR(S) : Barry D. Kurtz It is certified that error appears in the above-identified patent and that said Letters Patent is hereby corrected as shown below:

On the Title Page, Item (75), in "Inventor", line 1, delete "Boise" and insert -- Meridian --, therefor.

In column 2, line 40, delete "B" and insert -- 8 --, therefor.

In column 6, line 37, in Claim 20, insert -- The -- before "program".

Signed and Sealed this

Twenty-fourth Day of August, 2010

David J. Kappos
*Director of the United States Patent and Trademark Office*